United States Patent
Uemura et al.

(10) Patent No.: US 11,174,868 B2
(45) Date of Patent: Nov. 16, 2021

(54) TURBOCHARGER

(71) Applicant: KABUSHIKI KAISHA TOYOTA JIDOSHOKKI, Aichi (JP)

(72) Inventors: Akihito Uemura, Aichi-ken (JP); Shuichi Fujita, Aichi-ken (JP); Toshiya Kato, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 16/822,417

(22) Filed: Mar. 18, 2020

(65) Prior Publication Data

US 2020/0309144 A1    Oct. 1, 2020

(30) Foreign Application Priority Data

Mar. 25, 2019 (JP) .............................. JP2019-056680

(51) Int. Cl.
*F04D 29/056* (2006.01)
*F04D 29/58* (2006.01)

(52) U.S. Cl.
CPC ....... *F04D 29/056* (2013.01); *F04D 29/5853* (2013.01)

(58) Field of Classification Search
CPC .......... F01D 25/26; F02B 37/025; F02C 6/12; F04D 25/024; F04D 29/056; F04D 29/5853; F05D 2220/40; F05D 2260/941; Y02T 10/12
See application file for complete search history.

(56) References Cited

U.S. PATENT DOCUMENTS

| 10,145,267 B2 * | 12/2018 | Yokoyama | F02B 39/16 |
| 10,801,368 B2 * | 10/2020 | Sakamoto | F02B 39/14 |
| 11,015,478 B2 * | 5/2021 | Bolbolan | F02C 6/12 |
| 2014/0212277 A1 * | 7/2014 | Uesugi | F01D 17/145 |
| | | | 415/151 |
| 2016/0115823 A1 * | 4/2016 | Henke | F01D 25/145 |
| | | | 417/373 |

(Continued)

FOREIGN PATENT DOCUMENTS

| EP | 1734231 B1 | 12/2006 |
| JP | 2016-156279 | 9/2016 |

(Continued)

*Primary Examiner* — Jesse S Bogue
(74) *Attorney, Agent, or Firm* — Greenblum & Bernstein, P.L.C.

(57) ABSTRACT

A turbocharger includes a bearing housing, a turbine housing, a turbine chamber formed in the turbine housing, a turbine impeller rotating integrally with the impeller shaft by the exhaust gas flowing into the turbine chamber, a turbine scroll passage formed in the turbine housing, a communication passage, and a bearing housing side plate made of sheet metal and forming wall surfaces of the turbine scroll passage and the communication passage on the bearing housing side. The bearing housing side plate has an inner peripheral part of the bearing housing side plate is a stationary part relative to the bearing housing, and an outer peripheral end portion of the bearing housing side plate is a free end. The bearing housing side plate has an outer peripheral side surface of the bearing housing side plate is spaced from a first facing member that faces the outer peripheral wall side surface.

9 Claims, 5 Drawing Sheets (56) References Cited

U.S. PATENT DOCUMENTS

| | | |
|---|---|---|
| 2016/0290163 A1 | 10/2016 | Yokoyama et al. |
| 2019/0120132 A1* | 4/2019 | Bogner .................... F02C 6/12 |
| 2019/0316516 A1 | 10/2019 | Arai |
| 2020/0056505 A1* | 2/2020 | Sakamoto ............. F01D 25/243 |
| 2020/0056628 A1* | 2/2020 | Sakuma .................. F01D 25/08 |
| 2020/0392895 A1* | 12/2020 | Morath ................ F01D 17/165 |
| 2021/0010390 A1* | 1/2021 | Okamoto ................ F02B 39/16 |
| 2021/0087969 A1* | 3/2021 | Yoshida .................. F01D 9/048 |

FOREIGN PATENT DOCUMENTS

| | | |
|---|---|---|
| WO | WO2015/097872 | 7/2015 |
| WO | WO2019044777 A1 | 3/2019 |

* cited by examiner

TURBOCHARGER

CROSS-REFERENCE TO RELATED APPLICATION

This application claims priority to Japanese Patent Application No. 2019-056680 filed on Mar. 25, 2019, the entire disclosure of which is incorporated herein by reference.

BACKGROUND ART

The present disclosure relates to a turbocharger.

A housing of a turbocharger includes a bearing housing that rotatably supports an impeller shaft, a turbine housing that is connected to one end of the bearing housing and in which exhaust gas discharged from an internal combustion engine flows, and a compressor housing that is connected to the other end of the bearing housing and in which intake air to be introduced to the internal combustion engine flows.

A turbine chamber is formed in the turbine housing. The turbine chamber accommodates a turbine impeller that is connected to one end of the impeller shaft and that is rotated integrally with the impeller shaft by exhaust gas introduced into the turbine chamber. In addition, the turbine housing has a turbine scroll passage that is a part of a passage through which the exhaust gas flowing into the turbine housing is introduced to the turbine chamber, and a communication passage that provides communication between the turbine scroll passage and the turbine chamber.

A compressor impeller that is connected to the other end of the impeller shaft and rotates integrally with the turbine impeller is accommodated in the compressor housing. When the turbine impeller is rotated by the exhaust gas discharged from the internal combustion engine and the compressor impeller rotates integrally with the turbine impeller via the impeller shaft, the intake air flowing through the compressor housing is compressed by the rotation of the compressor impeller, and such compressed intake air is supplied to the internal combustion engine. The intake efficiency of the internal combustion engine is enhanced and the performance of the internal combustion engine is improved by such supercharging of the intake air to the internal combustion engine by the turbocharger.

A catalyst purifying exhaust gas is disposed downstream of the turbine housing of the turbocharger in a direction in which the exhaust gas flows. Purification of exhaust gas by the catalyst is accomplished by increasing the temperature of the catalyst to its activation temperature or higher. In a case where the temperature of exhaust gas is low, the temperature of the catalyst may not increase to the activation temperature or higher, and thus exhaust gas may not be sufficiently purified.

In general, since it is necessary to ensure rigidity, the turbine housing is formed so as to have thick walls by casting, so that the turbine housing has a great mass and a great heat capacity. Thus, heat of exhaust gas flowing through the turbine housing tends to reduce, thereby decreasing the temperature of the exhaust gas, while the exhaust gas flows through the turbine housing. As a result, it takes long to increase the temperature of the catalyst to the activation temperature or higher. This prevents increasing the temperature of the catalyst to the activation temperature or higher early when it is required to warm up the catalyst early, such as a cold start of the internal combustion engine.

Japanese Patent Application Publication No. 2016-156279 discloses a turbocharger in which a wall surface of the turbine scroll passage on the bearing housing side is formed by a bearing housing side plate made of sheet metal and having a ring shape. The bearing housing side plate suppresses the heat transfer from exhaust gas to the turbine housing. As a result, the temperature decrease in the exhaust gas is suppressed, while the exhaust gas flows through the turbine housing.

In the above-cited Publication, an outer peripheral edge of the bearing housing side plate is fixed to the turbine side passage forming member that forms the wall surface of the turbine scroll passage opposite from the bearing housing. An inner peripheral edge of the bearing housing side plate is fixed to the housing. This configuration hardly allows the thermal expansion of the bearing housing side plate, which occurs when the bearing housing side plate is heated by the exhaust gas. Thus, excessive stress locally acting on the bearing housing side plate may deform bearing housing side plate.

The present disclosure is directed to providing a turbocharger that permits the thermal expansion of a bearing housing side plate.

SUMMARY

In accordance with an aspect of the present disclosure, there is provided a turbocharger including a turbocharger including a bearing housing having a tubular shape that rotatably supports an impeller shaft, a turbine housing that is connected to one end of the bearing housing in a rotation axis direction of the impeller shaft and in which exhaust gas discharged from an internal combustion engine flows, a turbine chamber formed in the turbine housing, a turbine impeller accommodated in the turbine chamber, the turbine impeller rotating integrally with the impeller shaft by the exhaust gas flowing into the turbine chamber, a turbine scroll passage formed in the turbine housing, wherein the turbine scroll passage forms a part of a passage through which exhaust gas flowing into the turbine housing is introduced to the turbine chamber, and surrounding an outer periphery of the turbine chamber, a communication passage having an annular shape and formed in the turbine housing, the communication passage providing communication between the turbine scroll passage and the turbine chamber; and a bearing housing side plate made of sheet metal and having an annular shape, wherein the bearing housing side plate forms wall surfaces of the turbine scroll passage and the communication passage on the bearing housing side. An inner peripheral part of the bearing housing side plate is a stationary part relative to the bearing housing, and an outer peripheral end portion of the bearing housing side plate is a free end. An outer peripheral side surface of the bearing housing side plate is spaced from a first facing member that faces the outer peripheral wall side surface.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof may best be understood by reference to the following description of the presently preferred embodiments together with the accompanying drawings in which.

DETAILED DESCRIPTION OF THE EMBODIMENTS

Figure 1:
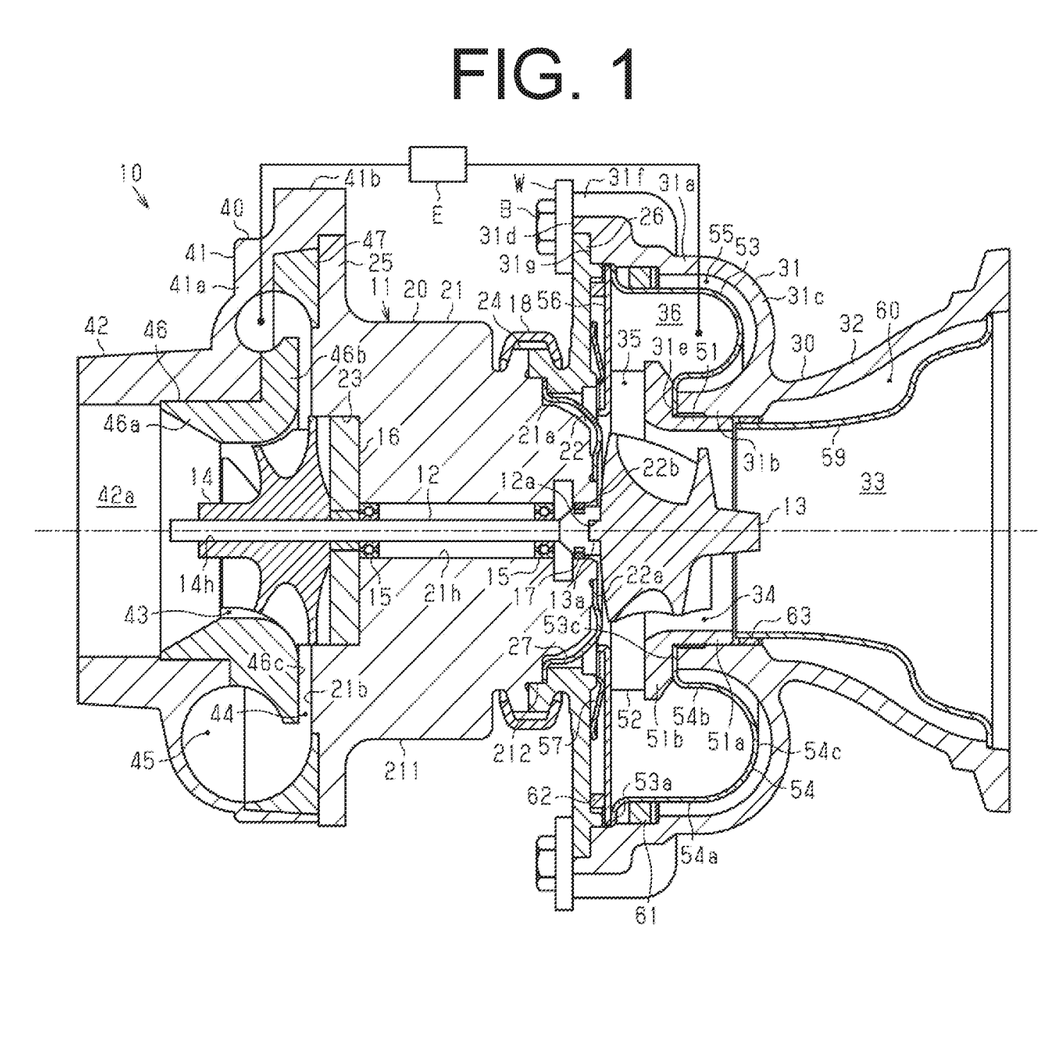
FIG. 1 is a side sectional view of a turbocharger according to an embodiment of the present disclosure.
Figure 2:
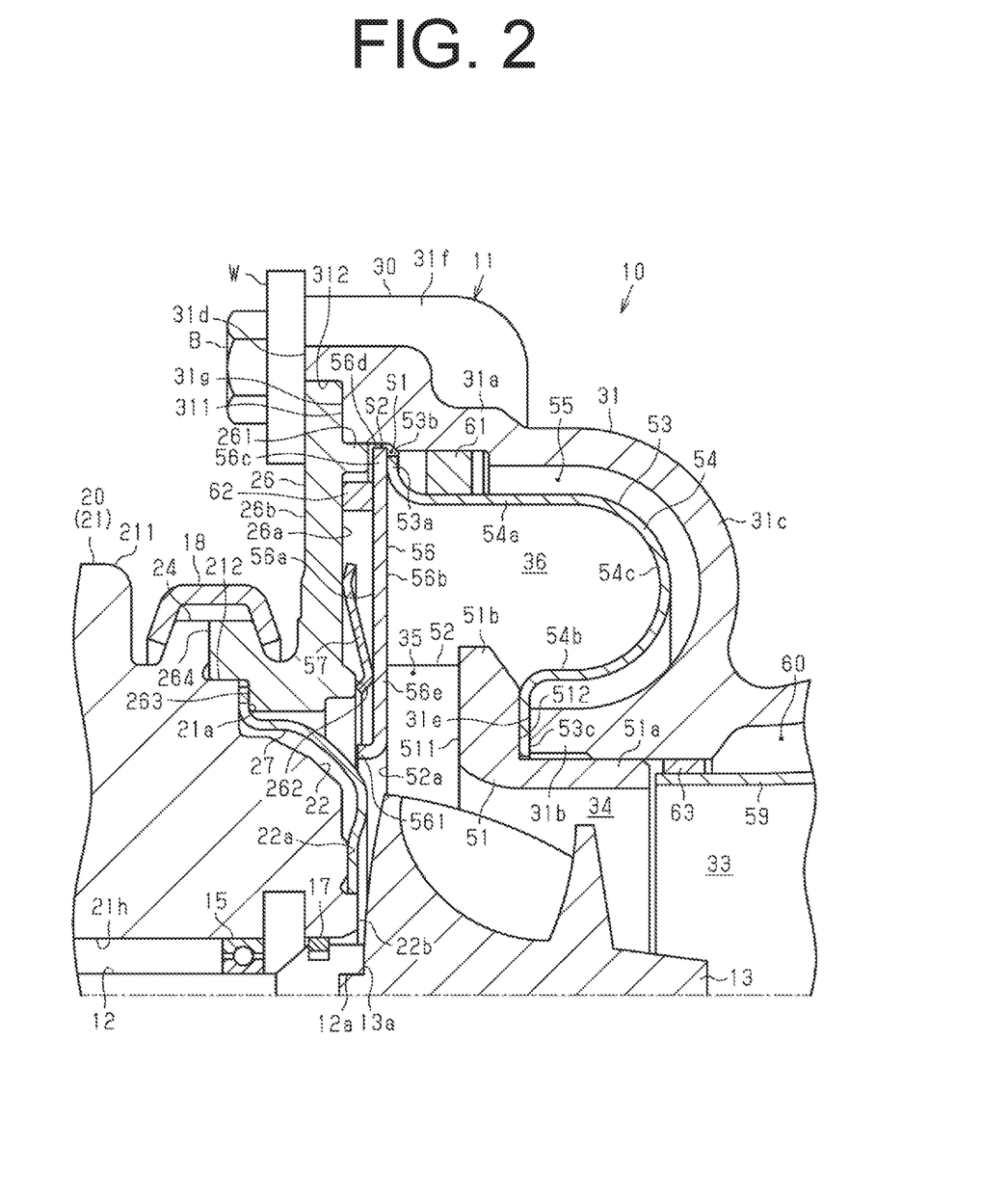
FIG. 2 is a partially enlarged side section view of the turbocharger of FIG. 1.

The following will describe an embodiment of a turbocharger according to the present disclosure with reference to FIGS. 1 and 2.

FIG. 1 depicts a turbocharger 10 having a housing 11 that includes a bearing housing 20, a turbine housing 30, and a compressor housing 40. The bearing housing 20, the turbine housing 30, and the compressor housing 40 are made of cast iron. Exhaust gas discharged from an internal combustion engine E flows inside the turbine housing 30. Intake air to be led to the internal combustion engine E flows inside the compressor housing 40. In the present embodiment, the internal combustion engine E is provided by a gasoline engine.

The bearing housing 20 has a tubular shape, and rotatably supports an impeller shaft 12. A turbine impeller 13 is connected to one end of the impeller shaft 12 in a rotation axis direction of the impeller shaft 12. Specifically, the impeller shaft 12 has a fitting recess 12a that is formed in one end surface in the rotation axis direction of the impeller shaft 12, and the turbine impeller 13 has a fitting projection 13a that is formed extending toward the impeller shaft 12 and may be fitted to the fitting recess 12a of the impeller shaft 12. With the fitting projection 13a of the turbine impeller 13 fitted to the fitting recess 12a of the impeller shaft 12, the turbine impeller 13 is attached to the impeller shaft 12 by welding or the like so that the turbine impeller 13 is rotatable integrally with the impeller shaft 12. A compressor impeller 14 is connected to the other end of the impeller shaft 12 in the rotation axis direction of the impeller shaft 12.

The turbine housing 30 is connected to one end of the bearing housing 20 in the rotation axis direction of the impeller shaft 12. The compressor housing 40 is connected to the other end of the bearing housing 20 in the rotation axis direction of the impeller shaft 12.

The bearing housing 20 includes a bearing housing body portion 21 having a tubular shape. The bearing housing body portion 21 has an insertion hole 21h through which the impeller shaft 12 is inserted. The bearing housing body portion 21 rotatably supports the impeller shaft 12 inserted through the insertion hole 21h via a radial bearing 15. An axial direction of the bearing housing body portion 21 coincides with the rotation axis direction of the impeller shaft 12.

The bearing housing body portion 21 of the bearing housing 20 has a large diameter portion 211, and a small diameter portion 212 that is continuous with one end of the large diameter portion 211 in the rotation axis direction of the impeller shaft 12. The outer diameter of the small diameter portion 212 is smaller than that of the large diameter portion 211. The small diameter portion 212 is located adjacent to the turbine housing 30 in the rotation axis direction of the impeller shaft 12. The bearing housing body portion 21 has a projected portion 22 having a tubular shape and projecting from an end surface 21a of the small diameter portion 212 in the rotation axis direction of the impeller shaft 12. The projected portion 22 is formed so that the outer diameter of the projected portion 22 reduces as away from the small diameter portion 212 in the rotation axis direction of the impeller shaft 12. The insertion hole 21h is opened at the end surface 22a of the projected portion 22. The C-ring 17, which serves as a sealing member, is interposed between the inner peripheral surface of the insertion hole 21h of the projected portion 22 and the outer peripheral surface of the impeller shaft 12. A projected portion 22b having an annular shape is formed projecting from the end surface 22a of the projected portion 22 around the insertion hole 21h in the end surface 22a of the projected portion 22.

The large diameter portion 211 has an end surface 21b in the rotation axis direction of the impeller shaft 12 in which a recessed portion 23 is formed. The insertion hole 21h is opened at the bottom surface of the recessed portion 23. The diameter of the recessed portion 23 is greater than that of the insertion hole 21h. The axis of the recessed portion 23 coincides with the axis of the insertion hole 21h. A thrust bearing 16 is accommodated in the recessed portion 23. The thrust bearing 16 is accommodated in the recessed portion 23 in contact with the bottom surface of the recessed portion 23.

The bearing housing 20 includes a small diameter side flange portion 24 that projects outwardly in a radial direction of the impeller shaft 12 from an outer peripheral surface of the small diameter portion 212, and a large diameter side flange portion 25 that projects outwardly in the radial direction of the impeller shaft 12 from an end of an outer peripheral surface of the large diameter portion 211 opposite from the small diameter portion 212. The small diameter side flange portion 24 and the large diameter side flange portion 25 each have a ring shape.

The compressor housing 40 has a compressor housing body portion 41 having a bottomed cylindrical shape. The compressor housing body portion 41 has a bottom wall 41a having a substantially disc-shape and a cylindrical peripheral wall 41b formed extending from an outer peripheral edge of the bottom wall 41a in the rotation axis direction of the impeller shaft 12. One surface of the peripheral wall 41b opposite from the bottom wall 41a is opened. The compressor housing 40 is connected to the other end of the bearing housing 20 in the rotation axis direction of the impeller shaft 12 with the end of the peripheral wall 41b of the compressor housing 40 having an opening and the large diameter side flange portion 25 of the bearing housing 20 fixed by bolts (not shown). The opening of the peripheral wall 41b is closed by the large diameter side end surface 21b of the bearing housing body portion 21 and the end surface of the large diameter side flange portion 25 located opposite from the small diameter side flange portion 24. Thus, the opening of the peripheral wall 41b is closed by the end surface located at the other end of the bearing housing 20 in the rotation axis direction of the impeller shaft 12.

The compressor housing 40 further has a compressor tubular portion 42 projecting from the bottom wall 41a in a direction opposite from of the peripheral wall 41b. The compressor tubular portion 42 has an inlet port 42a. The inlet port 42a extends in the rotation axis direction of the impeller shaft 12. The axis of the inlet port 42a coincides with the rotation axis of the impeller shaft 12.

A compressor impeller chamber 43, a diffuser passage 44, and a compressor scroll passage 45 are formed in the compressor housing 40. The compressor impeller chamber 43 is in communication with the inlet port 42a, and accommodates the compressor impeller 14. The compressor scroll passage 45 is formed extending around an outer periphery of the compressor impeller chamber 43 in a swirl shape. The diffuser passage 44 extends around the compressor impeller chamber 43 in an annular shape, and provides communication between the compressor impeller chamber 43 and the compressor scroll passage 45.

A compressor shroud 46 having a tubular shape is disposed in the compressor housing 40. The compressor shroud 46 includes a tubular portion 46a extending along the inner peripheral surface of the compressor tubular portion 42, and a ring portion 46b that is formed continuous with the tubular portion 46a, extending along the inner bottom surface of the bottom wall 41a in an annular shape. The compressor impeller chamber 43 is a space surrounded by the tubular portion 46a of the compressor shroud 46 and the recessed portion 23 of the bearing housing 20.

The compressor impeller 14 has a shaft insertion hole 14h that extends in the rotation axis direction of the impeller shaft 12 and through which the impeller shaft 12 is insertable. The other end of the impeller shaft 12 in the rotation axis direction thereof projects out in the compressor impeller chamber 43. The compressor impeller 14 is attached to the impeller shaft 12 by a nut (not shown) or the like so as to be rotatable integrally with the impeller shaft 12 with a portion of the impeller shaft 12 projecting out in the compressor impeller chamber 43 inserted into the shaft insertion hole 14h. An end of the compressor impeller 14 on the bearing housing 20 side is supported by the thrust bearing 16 via a seal ring collar and a thrust collar (neither shown). The thrust bearing 16 receives a load in the thrust direction acting on the compressor impeller 14.

The ring portion 46b of the compressor shroud 46 has a facing surface 46c facing the bearing housing 20, which has a flat surface shape, extending in the radial direction of the impeller shaft 12. The diffuser passage 44 is formed between the facing surface 46c of the ring portion 46b and a part of the end surface of the bearing housing 20 that is located at the other end in the rotation axis direction of the impeller shaft 12, and faces the facing surface 46c of the ring portion 46b in the rotation axis direction of the impeller shaft 12.

A scroll member 47 having an annular shape is disposed in the compressor housing 40. The scroll member 47 extends around the compressor shroud 46. A compressor scroll passage 45 is formed by the outer peripheral surface of the ring portion 46b of the compressor shroud 46, the inner bottom surface of the bottom wall 41a of the compressor housing body portion 41, and the inner peripheral surface of the scroll member 47. It is noted that the scroll member 47 and the compressor shroud 46 need not be necessarily formed separately from the compressor housing 40, but may be formed integrally with the compressor housing 40.

As shown in FIG. 2, the turbine housing 30 has a turbine housing body portion 31 having an annular shape surrounding the turbine impeller 13. The turbine housing body portion 31 has an outer peripheral wall 31a, an inner peripheral wall 31b, and a connecting wall 31c. The outer peripheral wall 31a and the inner peripheral wall 31b each extend in the rotation axis direction of the impeller shaft 12. The inner peripheral wall 31b is located inward of the outer peripheral wall 31a. The connecting wall 31c connects an end of the outer peripheral wall 31a opposite from the bearing housing 20 in the rotation axis direction of the impeller shaft 12 and an end of the inner peripheral wall 31b opposite from the bearing housing 20 in the rotation axis direction of the impeller shaft 12. The connecting wall 31c is curved in an arc, which is convex away from the bearing housing 20. The turbine housing body portion 31 has an opening that is opened to the bearing housing 20 side.

The turbine housing body portion 31 has an outer peripheral wall end surface 31d, and an inner peripheral wall end surface 31e that are located on the side thereof that is adjacent to the bearing housing 20 in the rotation axis direction of the impeller shaft 12. The outer peripheral wall end surface 31d is an end surface of the outer peripheral wall 31a. The inner peripheral wall end surface 31e is an end surface of the inner peripheral wall 31b and located inward of the outer peripheral wall end surface 31d. The end surface 31d of the outer peripheral wall 31a projects further than the end surface 31e of the inner peripheral wall 31b toward the bearing housing 20 in the rotation axis direction of the impeller shaft 12. The turbine housing body portion 31 has a connecting projection 31f projecting outwardly in the radial direction of the impeller shaft 12 from an end of the outer surface of the outer peripheral wall 31a adjacent to the bearing housing 20. The turbine housing body portion 31 has a groove portion 31g recessed in the inner peripheral portion of the outer peripheral wall end surface 31d. The groove portion 31g is opened at the inner surface of the outer peripheral wall 31a. The groove portion 31g includes an inner bottom surface 311 extending in the radial direction of the impeller shaft 12, and an inner peripheral surface 312 extending in the rotation axis direction of the impeller shaft 12.

As shown in FIG. 1, the turbine housing 30 includes a turbine tubular portion 32, extending from the inner peripheral wall 31b of the turbine housing body portion 31 in a direction opposite from the opening of the turbine housing body portion 31. The turbine tubular portion 32 has a shape whose diameter increases as separated away from the turbine housing body portion 31. An outlet port 33 is formed in the turbine tubular portion 32. The outlet port 33 extends in the rotation axis direction of the impeller shaft 12. The axis of the outlet port 33 coincides with the rotation axis of the impeller shaft 12. A downstream exhaust pipe (not shown) is connected to the turbine tubular portion 32. The downstream exhaust pipe connects between the turbocharger 10 and a catalyst (not shown) disposed downstream of the turbine housing 30 in a direction in which exhaust gas flows. The catalyst purifies exhaust gas. Purification of exhaust gas by the catalyst is accomplished by increasing the temperature of the catalyst to its activation temperature or higher.

As shown in FIG. 2, the bearing housing 20 has a closing plate 26 that has a ring shape and covers the opening of the turbine housing body portion 31. The closing plate 26 has a first end surface 26a that is located adjacent to the turbine housing body portion 31 in the rotation axis direction of the impeller shaft 12 and in which a first projection 261 and a second projection 262 are formed. The first projection 261 and the second projection 262 have a ring shape and project toward the turbine housing body portion 31. The first projection 261 is formed at a position adjacent to the outer peripheral edge of the closing plate 26, and the second projection 262 is formed at a position adjacent to the inner peripheral edge of the closing plate 26. The closing plate 26 has a second end surface 26b that is located opposite from the turbine housing body portion 31 in the rotation axis direction of the impeller shaft 12 and in which a third projection 263 having a ring shape is formed. The third projection 263 is formed at a position adjacent to the inner peripheral edge of the closing plate 26. The closing plate 26 has a connecting protrusion 264 extending from the outer peripheral edge of an end surface of the third projection 263 in the radial direction of the impeller shaft 12.

The closing plate 26 is connected to the bearing housing body portion 21 with the small diameter side flange portion 24 of the bearing housing body portion 21 and the connecting protrusion 264 of the closing plate 26 held by the fastening force of the clamp member 18. With the closing plate 26 connected to the bearing housing body portion 21, the closing plate 26 is located so as to surround the projected portion 22 of the bearing housing body portion 21.

A cover member 27 is disposed between an outer surface of the projected portion 22 of the bearing housing body portion 21 and an inner peripheral surface of the closing plate 26 in the radial direction of the impeller shaft 12. The cover member 27 is a heat insulator. The cover member 27 has a shape that extends along the outer surface of the projected portion 22 of the bearing housing body portion 21 and is disposed spaced from the outer surface of the projected portion 22. An inner peripheral portion of the cover member 27 is fixed to the end surface 22a of the projected portion 22, and an inner peripheral edge of the cover member 27 faces an outer peripheral surface of the projected portion 22b. The outer peripheral portion of the cover member 27 is held between the end surface of the third projection 263 and the small diameter side end surface 21a of the bearing housing body portion 21. The outer peripheral edge of the cover member 27 faces an inner peripheral surface of the connecting protrusion 264.

The outer peripheral part of the closing plate 26 located radially outward of the first projection 261 is disposed between the inner bottom surface 311 of the groove portion 31g of the turbine housing body portion 31 and an one end surface of a washer W in the rotation axis direction of the impeller shaft 12. A portion of the first end surface 26a of the closing plate 26 forming the outer peripheral part is in contact with the inner bottom surface 311 of the groove portion 31g of the turbine housing body portion 31, and a portion of the second end surface 26b of the closing plate 26 forming the outer peripheral part is in contact with the one end surface of the washer W. Additionally, the one end surface of the washer W is in contact with the outer peripheral wall end surface 31d of the turbine housing body portion 31. The outer peripheral edge of the closing plate 26 faces the inner peripheral surface 312 of the groove portion 31g of the turbine housing body portion 31.

The bearing housing 20 and the turbine housing 30 are connected by a bolt B. The bolt B extends through the washer W and is screwed into the connecting projection 31f of the outer peripheral wall 31a with the closing plate 26 disposed between the turbine housing body portion 31 and the washer W. The turbine housing 30 is connected to one end of the bearing housing 20 in the rotation axis direction of the impeller shaft 12 with the outer peripheral part of the closing plate 26 held between the washer W and the turbine housing body portion 31 in the rotation axis direction of the impeller shaft 12.

A turbine chamber 34, a communication passage 35, and a turbine scroll passage 36 are formed in the turbine housing body portion 31 of the turbine housing 30. The turbine impeller 13 is accommodated in the turbine chamber 34. The turbine scroll passage 36 is formed extending around the outer periphery of the turbine chamber 34 in a swirl shape. Thus, the turbine scroll passage 36 surrounds the outer periphery of the turbine chamber 34. The turbine scroll passage 36 forms a part of a passage through which exhaust gas flowing into the turbine housing 30 from an intake port (not shown) is introduced to the turbine chamber 34. The communication passage 35 extends around the turbine chamber 34 in an annular shape, and provides communication between the turbine scroll passage 36 and the turbine chamber 34.

A turbine shroud portion 51 is provided inside the turbine housing body portion 31 of the turbine housing 30. The turbine shroud portion 51 includes a tubular portion 51a extending along an inner peripheral surface of the tubular portion 32, and a ring portion 51b that is formed continuous with the tubular portion 51a and extends along the inner peripheral wall end surface 31e of the turbine housing body portion 31 in an annular shape. The turbine shroud portion 51 includes a plurality of fixed vanes 52 that is fixed to one end surface 511 of the ring portion 51b opposite from the tubular portion 51a. The fixed vanes 52 are spaced from each other in the circumferential direction of the ring portion 51b. The angles of the fixed vanes 52 relative to the ring portion 51b correspond to a cross sectional area of the communication passage 35. The cross sectional area of the communication passage 35 is set so as to achieve the desired flow rate of the exhaust gas to be introduced to the turbine chamber 34, and the angles of the fixed vanes 52 are set to provide the set cross sectional area of the communication passage 35.

The turbocharger 10 has a first passage forming plate 53 having an annular shape, and disposed in the turbine housing body portion 31 of the turbine housing 30. The first passage forming plate 53 is made of sheet metal, and the thickness of the first passage forming plate 53 is smaller than that of the turbine housing 30. The first passage forming plate 53 is disposed in a space surrounded by the outer peripheral wall 31a, the inner peripheral wall 31b, and the connecting wall 31c of the turbine housing body portion 31. The first passage forming plate 53 is formed extending around the outer periphery of the turbine chamber 34 in a swirl shape. The first passage forming plate 53 has a passage forming part 54 that forms a part of a wall surface of the turbine scroll passage 36. The passage forming part 54 includes an outer peripheral portion 54a, an inner peripheral portion 54b located inward of the outer peripheral portion 54a, and a connecting portion 54c connecting the outer peripheral portion 54a and the inner peripheral portion 54b.

Specifically, the outer peripheral portion 54a has a shape extending along the inner surface of the outer peripheral wall 31a of the turbine housing body portion 31, and extends in the rotation axis direction of the impeller shaft 12. The inner peripheral portion 54b has a shape extending along the inner surface of the inner peripheral wall 31b of the turbine housing body portion 31 positioned adjacent to the outer peripheral wall 31a. The connecting portion 54c connects an end of the outer peripheral portion 54a opposite from the bearing housing 20 in the rotation axis direction of the impeller shaft 12 and an end of the inner peripheral portion 54b opposite from the bearing housing 20 in the rotation axis direction of the impeller shaft 12. The connecting portion 54c has a shape extending along the inner surface of the connecting wall 31c of the turbine housing body portion 31. The connecting portion 54c has a shape curved in an arc, which is convex away from the bearing housing 20. The passage forming part 54 is opened to the bearing housing 20. The outer peripheral portion 54a has a ring rib 53a formed in an end of the outer peripheral portion 54a that is opened, which projects outwardly in the radial direction of the impeller shaft 12. The ring rib 53a corresponds to the outer peripheral end portion of the first passage forming plate 53, and the end surface 53b of the ring rib 53a corresponds to the outer peripheral side surface of the first passage forming plate 53.

The outer peripheral portion 54a of the passage forming part 54 is located inward of the outer peripheral wall 31a of the turbine housing body portion 31 in the radial direction of the impeller shaft 12. A gap is formed between the outer peripheral portion 54a and the outer peripheral wall 31a. The inner peripheral portion 54b of the passage forming part 54 is located outward of the inner peripheral wall 31b of the turbine housing body portion 31 in the radial direction of the impeller shaft 12. A gap is formed between the inner peripheral portion 54b and the inner peripheral wall 31b. The connecting portion 54c of the passage forming part 54 is located closer to the bearing housing 20 than the connecting wall 31c of the turbine housing body portion 31 is in the rotation axis direction of the impeller shaft 12. That is, the passage forming part 54 is accommodated in the turbine housing body portion 31 with the passage forming part 54 spaced from the turbine housing body portion 31. A space between the passage forming part 54 and the turbine housing body portion 31 forms a first heat insulation layer 55. In addition, the end surface 53b of the ring rib 53a faces the inner surface of the outer peripheral wall 31a of the turbine housing body portion 31 with a gap S1 formed therebetween in the radial direction of the impeller shaft 12. In other words, the end surface 53b of the ring rib 53a is spaced from the outer peripheral wall 31a of the turbine housing body portion 31.

A first elastic member 61, serving as an elastic member, is interposed between the outer peripheral portion 54a of the passage forming part 54 and the outer peripheral wall 31a of the turbine housing body portion 31 in the radial direction of the impeller shaft 12. The first elastic member 61 has an annular shape, and is mounted on the outer peripheral portion 54a of the passage forming part 54. In the present embodiment, the first elastic member 61 is provided by a wire mesh, and is welded to the outer peripheral portion 54a of the passage forming part 54 by micro spot welding. The first elastic member 61 is disposed between the outer peripheral portion 54a of the passage forming part 54 and the outer peripheral wall 31a of the turbine housing body portion 31 in a state where the first elastic member 61 is pressed and deformed. The outer peripheral portion 54a of the passage forming part 54 is supported by the turbine housing body portion 31 via the first elastic member 61.

The first passage forming plate 53 has a plate portion 53c having an annular shape and projecting inward in the radial direction of the impeller shaft 12 from the end of the inner peripheral portion 54b of the passage forming part 54 having the opening, and having a flat shape extending along the radial direction of the impeller shaft 12. The plate portion 53c is an inner peripheral part of the first passage forming plate 53. The plate portion 53c is located between the other end surface 512 of the ring portion 51b of the turbine shroud portion 51 located adjacent to the tubular portion 51a, and the inner peripheral wall end surface 31e of the turbine housing body portion 31 in the rotation axis direction of the impeller shaft 12.

The turbocharger 10 has a second passage forming plate 56 having an annular shape, which forms a part of the wall surface of the turbine scroll passage 36. The second passage forming plate 56 is made of sheet metal, and the thickness of the second passage forming plate 56 is smaller than that of the turbine housing 30. The second passage forming plate 56 is located outward of the turbine impeller 13 in the radial direction of the impeller shaft 12. The second passage forming plate 56 is located between the closing plate 26 and the first passage forming plate 53 in the rotation axis direction of the impeller shaft 12. The second passage forming plate 56 has a first end surface 56a that faces the first end surface 26a of the closing plate 26, and a second end surface 56b. A part of the second end surface 56b faces the connecting portion 54c of the passage forming part 54 of the first passage forming plate 53. In other words, the first passage forming plate 53 faces the second passage forming plate 56. An inner peripheral end of the second passage forming plate 56 is bent in a direction in which the first end surface 56a is disposed to form a rib 561. A part of the second passage forming plate 56 other than the rib 561 has a flat shape.

The second passage forming plate 56 has an outer peripheral end portion 56c that is located between the end surface of the first projection 261 of the closing plate 26 and the ring rib 53a of the first passage forming plate 53. The outer peripheral end portion 56c of the second passage forming plate 56 is spaced from the end surface of the first projection 261 of the closing plate 26 and is in contact with the ring rib 53a of the first passage forming plate 53. A side of the ring rib 53a opposite from the second passage forming plate 56 is spaced from the first elastic member 61. The ring rib 53a of the first passage forming plate 53 and the outer peripheral end portion 56c of the second passage forming plate 56 each are a free end. In addition, the second passage forming plate 56 includes an outer peripheral side surface 56d that faces the inner surface of the outer peripheral wall 31a of the turbine housing body portion 31 with a gap S2 formed therebetween in the radial direction of the impeller shaft 12. In other words, the outer peripheral side surface 56d of the second passage forming plate 56 is spaced from the outer peripheral wall 31a of the turbine housing body portion 31. According to the present embodiment, the outer peripheral wall 31a of the turbine housing body portion 31 serves as a first facing member that faces the outer peripheral side surface 56d of the second passage forming plate 56 in the radial direction of the impeller shaft 12, and as a second facing member that faces the end surface 53b of the ring rib 53a of the first passage forming plate 53 in the radial direction of the impeller shaft 12.

A second elastic member 62 is interposed between the first end surface 56a of the second passage forming plate 56 and the first end surface 26a of the closing plate 26 in the rotation axis direction of the impeller shaft 12. The second elastic member 62 is located inward of the first projection 261 in the radial direction of the impeller shaft 12. The second elastic member 62 has an annular shape and is attached to the first end surface 56a of the second passage forming plate 56. In the present embodiment, the second elastic member 62 is provided by a wire mesh, and is welded to a part of the first end surface 56a of the second passage forming plate 56 adjacent to the outer peripheral end portion 56c by micro spot welding. The second elastic member 62 is disposed between the first end surface 26a of the closing plate 26 and the first end surface 56a of the second passage forming plate 56 in a state where the second elastic member 62 is pressed and deformed. A part of the second passage forming plate 56 adjacent to the outer peripheral end portion 56c is supported by the closing plate 26 via the second elastic member 62.

A plate spring 57 having an annular shape is interposed between the first end surface 56a of the second passage forming plate 56 and the first end surface 26a of the closing plate 26 in the rotation axis direction of the impeller shaft 12. The plate spring 57 corresponds to the urging member. The plate spring 57 is located inward of the second elastic member 62 in the radial direction of the impeller shaft 12. The plate spring 57 is held between the closing plate 26 and the second passage forming plate 56 in a state where the plate spring 57 is compressed in the rotation axis direction of the impeller shaft 12 with respect to its pre-deformed original shape. An outer peripheral part of the plate spring 57 is in contact with the first end surface 26*a* of the closing plate 26, and an inner peripheral part of the plate spring 57 is in contact with the first end surface 56*a* of the second passage forming plate 56. The plate spring 57 urges a part of the inner peripheral part 56*e* of the second passage forming plate 56 in a direction opposite from the bearing housing 20 by its reaction force to return to the pre-deformed original shape. The inner peripheral part 56*e* of the second passage forming plate 56 is located between the bearing housing 20 and the end surface 52*a* of the fixed vanes 52 disposed opposite from the turbine shroud portion 51. The fixed vanes 52 maintain a space between the second end surface 56*b* of the second passage forming plate 56 and the one end surface 511 of the ring portion 51*b* of the turbine shroud portion 51 in the rotation axis direction of the impeller shaft 12. Accordingly, the fixed vanes 52 of the present embodiment serve as a spacer that maintains a space between the second end surface 56*b* of the second passage forming plate 56 and the one end surface 511 of the ring portion 51*b* of the turbine shroud portion 51.

With a part of the inner peripheral part 56*e* of the second passage forming plate 56 urged by the plate spring 57 in a direction opposite from the bearing housing 20, that is, toward the fixed vanes 52, the plate portion 53*c* of the first passage forming plate 53, the ring portion 51*b* of the turbine shroud portion 51, the fixed vanes 52, and the inner peripheral part 56*e* of the second passage forming plate 56 are pressed toward the inner peripheral wall end surface 31*e* of the turbine housing body portion 31, and supported by the inner peripheral wall end surface 31*e*. The plate portion 53*c* of the first passage forming plate 53 is held by the other end surface 512 of the ring portion 51*b* of the turbine shroud portion 51 and the inner peripheral wall end surface 31*e* of the turbine housing body portion 31. Thus, the plate portion 53*c* is a stationary part of the first passage forming plate 53 that does not move relative to the turbine housing 30. A part of the inner peripheral part 56*e* of the second passage forming plate 56 is held between the closing plate 26 and the fixed vanes 52 via the plate spring 57. Thus, the inner peripheral part 56*e* of the second passage forming plate 56 is a stationary part that does not move relative to the bearing housing 20.

The turbine chamber 34 is a space surrounded by an inner peripheral surface of the tubular portion 51*a* of the turbine shroud portion 51, and an outer surface of the cover member 27. The communication passage 35 is a space formed between the one end surface 511 of the ring portion 51*b* of the turbine shroud portion 51 and a part of the second end surface 56*b* of the second passage forming plate 56 forming the inner peripheral part 56*e*. Thus, a part of the second end surface 56*b* of the second passage forming plate 56 forming the inner peripheral part 56*e* forms a wall surface of the communication passage 35 on the bearing housing 20 side. The one end surface 511 of the ring portion 51*b* of the turbine shroud portion 51 forms a wall surface of the communication passage 35 opposite from the bearing housing 20. A plurality of fixed vanes 52 is disposed in the communication passage 35.

The turbine scroll passage 36 is a space surrounded by the outer peripheral portion 54*a*, the inner peripheral portion 54*b*, and the connecting portion 54*c* of the passage forming part 54 of the first passage forming plate 53, and the second end surface 56*b* of the second passage forming plate 56. The second end surface 56*b* of the second passage forming plate 56 forms the wall surface of the turbine scroll passage 36 on the bearing housing 20 side. Thus, the second passage forming plate 56 corresponds to the bearing housing side plate that forms the wall surface of the turbine scroll passage 36 and the communication passage 35 on the bearing housing 20 side. Additionally, the first passage forming plate 53 corresponds to the turbine side plate that forms the wall surface of the turbine scroll passage 36 opposite from the bearing housing 20. The inner peripheral part of the plate spring 57 in contact with the second passage forming plate 56 is disposed side by side with the communication passage 35 with the second passage forming plate 56 disposed between the plate spring 57 and the communication passage 35. Although it is not shown in the drawings, the passage forming part 54 of the first passage forming plate 53 has a shape that gradually reduces the cross sectional area of the turbine scroll passage 36 from an end thereof adjacent to the intake port toward the communication passage 35 as the passage forming part 54 extends around the turbine scroll passage 36 in the circumferential direction thereof.

The turbocharger 10 includes an outlet port forming member 59 having a tubular shape that is disposed inside the turbine tubular portion 32 and forms a wall surface of the outlet port 33. The outlet port forming member 59 is made of sheet metal, and the thickness of the outlet port forming member 59 is smaller than that of the turbine housing 30. The outer peripheral surface of the outlet port forming member 59 is spaced from the inner peripheral surface of the turbine tubular portion 32. A space between the outer peripheral surface of the outlet port forming member 59 and the inner peripheral surface of the turbine tubular portion 32 forms a second heat insulation layer 60. A third elastic member 63 is interposed between an end portion of the outer peripheral surface of the outlet port forming member 59 on the turbine chamber 34 side and the inner peripheral surface of the turbine tubular portion 32. The third elastic member 63 has an annular shape, and is mounted on the outer peripheral surface of the outlet port forming member 59. In the present embodiment, the third elastic member 63 is provided by a wire mesh, and is welded to the outer peripheral surface of the outlet port forming member 59 by micro spot welding. The third elastic member 63 is disposed between the outer peripheral surface of the outlet port forming member 59 and the inner peripheral surface of the turbine tubular portion 32 in a state where the third elastic member 63 is pressed and deformed. The outlet port forming member 59 is supported by the turbine tubular portion 32 via the third elastic member 63.

The following will describe the operation of the present embodiment.

Exhaust gas discharged from the internal combustion engine E is led to the turbine scroll passage 36 through the intake port. The exhaust gas led to the turbine scroll passage 36 is introduced into the turbine chamber 34 through the communication passage 35. The first heat insulation layer 55 suppresses the heat transfer from the exhaust gas to the turbine housing body portion 31 of the turbine housing 30 while the exhaust gas flows through the turbine scroll passage 36. With the exhaust gas introduced into the turbine chamber 34, the turbine impeller 13 rotates. With the rotation of the turbine impeller 13, the compressor impeller 14 rotates integrally with the turbine impeller 13 via the impeller shaft 12. With the rotation of the compressor impeller 14, intake air introduced into the compressor impeller chamber 43 through the inlet port 42*a* is compressed, which is decelerated while passing through the diffuser passage 44, and velocity energy of the intake air is converted to pressure energy. Then, the high-pressured intake air is discharged to the compressor scroll passage 45, and is supplied to the internal combustion engine E. Such supercharging of the intake air to the internal combustion engine E by the turbocharger 10 enhances the intake efficiency of the internal combustion engine E to thereby improve the performance of the internal combustion engine E. Exhaust gas flowing through the turbine chamber 34 flows out from the outlet port 33 and is led to the catalyst through the downstream exhaust pipe, and is purified by the catalyst. The second heat insulation layer 60 suppresses the heat transfer from the exhaust gas to the turbine tubular portion 32 of the turbine housing 30 while exhaust gas flowing through the outlet port 33.

The temperature of the exhaust gas flowing through the turbine scroll passage 36 is high, for example, between 900 degrees and 950 degrees. Thus, the temperature of the exhaust gas causes the thermal expansion of the second passage forming plate 56 forming the turbine scroll passage 36. An amount of the thermal expansion of the second passage forming plate 56 is greater in an outer peripheral side than in an inner peripheral side. In the present embodiment, the inner peripheral part 56e of the second passage forming plate 56 is a stationary part of the second passage forming plate 56 that does not move relative to the bearing housing 20 with the inner peripheral part 56e held between the first end surface 26a of the closing plate 26 and the plurality of fixed vanes 52 via the plate spring 57. On the other hand, the outer peripheral end portion 56c of the second passage forming plate 56 is a free end. The outer peripheral side surface 56d of the second passage forming plate 56 is spaced from the inner surface of the outer peripheral wall 31a of the turbine housing body portion 31. This configuration allows the thermal expansion of the second passage forming plate 56 in the outer peripheral part where the amount of the thermal expansion is greater. Since the inner peripheral side part of the second passage forming plate 56 is held by parts such as a support plate (not shown), the sliding movement of the inner peripheral part of the second passage forming plate 56 resulting from the thermal expansion is allowed.

The following will describe the effects of the present embodiment.

(1) The high-temperature exhaust gas flowing through the turbine scroll passage 36 causes the thermal expansion of the second passage forming plate 56 forming the turbine scroll passage 36. The amount of the thermal expansion of the second passage forming plate 56 is greater in the outer peripheral side than in the inner peripheral side. The inner peripheral part 56e of the second passage forming plate 56 is a stationary part that does not move relative to the bearing housing 20, and the outer peripheral end portion 56c of the second passage forming plate 56 is a free end. The outer peripheral side surface 56d of the second passage forming plate 56 is spaced from the inner surface of the outer peripheral wall 31a of the turbine housing body portion 31. This configuration allows the thermal expansion of the second passage forming plate 56 in the outer peripheral part thereof where the amount of the thermal expansion is greater, (2) The high-temperature exhaust gas flowing through the turbine scroll passage 36 causes the thermal expansion of the first passage forming plate 53 forming the turbine scroll passage 36. The amount of the thermal expansion of the first passage forming plate 53 is greater in the outer peripheral side than in the inner peripheral side. The plate portion 53c of the first passage forming plate 53 is a stationary part that does not move relative to the turbine housing 30, and the ring rib 53a that is an outer peripheral end portion of the first passage forming plate 53 is a free end, The end surface 53b of the ring rib 53a is spaced from the inner surface of the outer peripheral wall 31a of the turbine housing body portion 31. This configuration allows the thermal expansion of the first passage forming plate 53 in the outer peripheral part thereof where the amount of the thermal expansion is greater.

(3) The inner peripheral part 56e of the second passage forming plate 56 serves as a stationary part that does not move relative to the bearing housing 20 with the inner peripheral part 56e held between the first end surface 26a of the closing plate 26 and the plurality of fixed vanes 52 via the plate spring 57. Thus, the inner peripheral part 56e of the second passage forming plate 56 serves as the stationary part without welding the second passage forming plate 56 and the bearing housing 20. Additionally, the plate portion 53c of the first passage forming plate 53 serves as a stationary part that does not move relative to the turbine housing 30 with the plate portion 53c held between the ring portion 51b of the turbine shroud portion 51 and the inner peripheral wall 31b of the turbine housing body portion 31. Thus, the plate portion 53c of the first passage forming plate 53 serves as a stationary part without welding the first passage forming plate 53 and the turbine housing 30.

(4) The plate spring 57 is interposed between the second passage forming plate 56 and the closing plate 26 in the rotation axis direction of the impeller shaft 12. In a case where the plate spring 57 is not provided, a gap between the first end surface 26a of the closing plate 26 and the end surface 52a of the fixed vanes 52 becomes greater than the thickness of the second passage forming plate 56 depending on the dimensional tolerance of the closing plate 26 when a part of the first end surface 26a of the closing plate 26 forming the outer peripheral part is placed in contact with the inner bottom surface 311 of the groove portion 31g of the turbine housing body portion 31, which may prevent the closing plate 26 and the fixed vanes 52 from holding the inner peripheral part 56e of the second passage forming plate 56 sufficiently. In a case where the plate spring 57 is provided to urge the inner peripheral part 56e of the second passage forming plate 56 toward the fixed vanes 52, on the other hand, the inner peripheral part 56e of the second passage forming plate 56 is held between the closing plate 26 and the fixed vanes 52 via the plate spring 57, regardless of the dimension tolerance of the closing plate 26.

(5) The urging force of the plate spring 57 toward the inner peripheral wall 31b of the turbine housing body portion 31 acts on the ring portion 51b of the turbine shroud portion 51 via the second passage forming plate 56 and the fixed vanes 52. The plate portion 53c of the first passage forming plate 53 is pressed toward the inner peripheral wall 31b of the turbine housing body portion 31 by the urging force acting on the ring portion 51b of the turbine shroud portion 51. Accordingly, the urging force of the plate spring 57 permits holding of the plate portion 53c of the first passage forming plate 53 by the turbine shroud portion 51 and the turbine housing 30, in addition to holding of the inner peripheral part 56e of the second passage forming plate 56 by the bearing housing 20 and the fixed vanes 52.

(6) The second elastic member 62 is interposed between a part of the second passage forming plate 56 adjacent to the outer peripheral end portion 56c and the closing plate 26 in the rotation axis direction of the impeller shaft 12.

The second elastic member 62 absorbs the vibration of the second passage forming plate 56. Accordingly, the noise generated by a contact between the second passage forming plate 56 and the closing plate 26 caused by the vibration of the second passage forming plate 56 is suppressed.

(7) The projected portion 22 of the bearing housing 20 is covered with the cover member 27. The cover member 27 suppresses the transfer of the heat of exhaust gas flowing through the turbine chamber 34 to the C-ring 17 via the bearing housing 20. This may suppresses the deterioration of the sealing between the inner peripheral surface of the insertion hole 21h and the outer peripheral surface of the impeller shaft 12 caused by the heat deformation of the C-ring 17.

(8) The surface roughness of the wall surface of the turbine scroll passage 36 may be reduced by forming the wall surface of the turbine scroll passage 36 by the first passage forming plate 53 and the second passage forming plate 56 made of sheet metal, as compared with the case where the wall surface of the turbine scroll passage 36 is formed by the bearing housing 20 and the turbine housing 30 made of cast iron. This increases the efficiency of the turbocharger 10.

(9) The first heat insulation layer 55 is provided between the passage forming part 54 of the first passage forming plate 53 and the turbine housing body portion 31. The first heat insulation layer 55 suppresses transfer of the heat of the exhaust gas flowing through the turbine scroll passage 36 to the turbine housing body portion 31. Further, the second heat insulation layer 60 is provided between the turbine tubular portion 32 and the outlet port forming member 59. The second heat insulation layer 55 suppresses transfer of the heat of the exhaust gas flowing through the outlet port 33 to the turbine tubular portion 32. This permits using cast iron, which is inferior in heat resistance but is lower in price than cast steel, as a material for the turbine housing 30. As a result, the manufacturing cost of the turbocharger 10 may be reduced.

The present embodiment may be modified in various manners, as exemplified below. The above-described embodiment and the modification may be implemented in combination with each other within the scope of the present disclosure.

Figure 3:
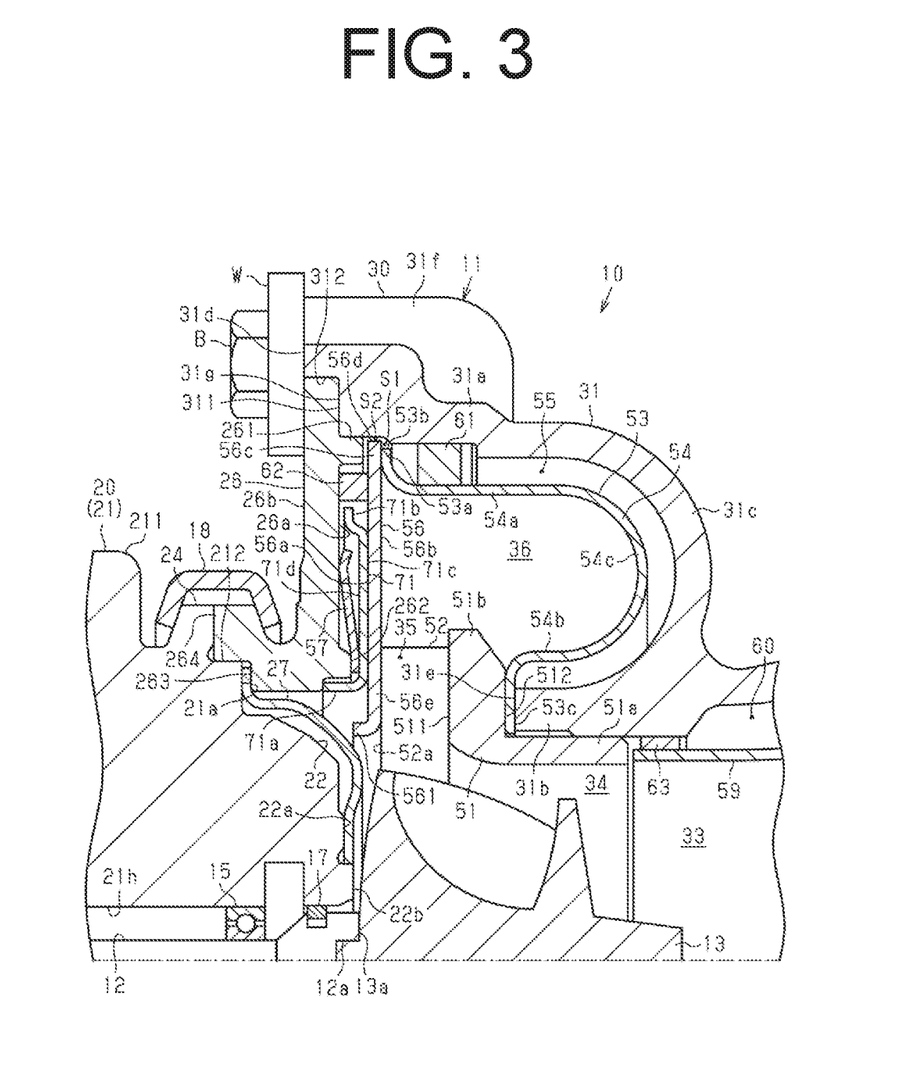
FIG. 3 is a side sectional view of another example of the turbocharger according to the present disclosure.

As shown in FIG. 3, an annular plate 71 may be interposed between the plate spring 57 and the second passage forming plate 56 in the rotation axis direction of the impeller shaft 12. The annular plate 71 has an annular shape and corresponds to the heat insulator of the present disclosure. The annular plate 71 has a first rib 71a projecting towards bearing housing 20 from the inner peripheral part and a second rib 71b projecting toward bearing housing 20 from the outer peripheral part of the annular plate 71. Thus, the annular plate 71 has a curved shape, which is convex toward the second passage forming plate 56. The annular plate 71 has an end surface 71c opposite from the first rib 71a and the second rib 71b, which is in contact with the first end surface 56a of the second passage forming plate 56.

Similarly to the above-described embodiment, the outer peripheral part of the plate spring 57 is in contact with the first end surface 26a of the closing plate 26, and the inner peripheral part of the plate spring 57 is in contact with an end surface 71d of the annular plate 71 disposed on a side which the first rib 71a and the second rib 71b project. The plate spring 57 urges a part of the inner peripheral part 56e of the second passage forming plate 56 toward the fixed vanes 52 via the annular plate 71. Accordingly, the plate portion 53c of the first passage forming plate 53, the ring portion 51b of the turbine shroud portion 51, the fixed vanes 52, the inner peripheral part 56e of the second passage forming plate 56, and the annular plate 71 are pressed toward the inner peripheral wall end surface 31e of the turbine housing body portion 31, and supported by the end surface 31e.

In this configuration, the annular plate 71 suppresses the transfer of the heat of exhaust gas flowing through the communication passage 35 to the plate spring 57 via the second passage forming plate 56. Thus, the thermal deformation of the plate spring 57 may be suppressed, so that the plate spring 57 may apply the urging force to the second passage forming plate 56 stably. Accordingly, the second passage forming plate 56 may be stably held between the closing plate 26 and the fixed vanes 52.

Figure 4:
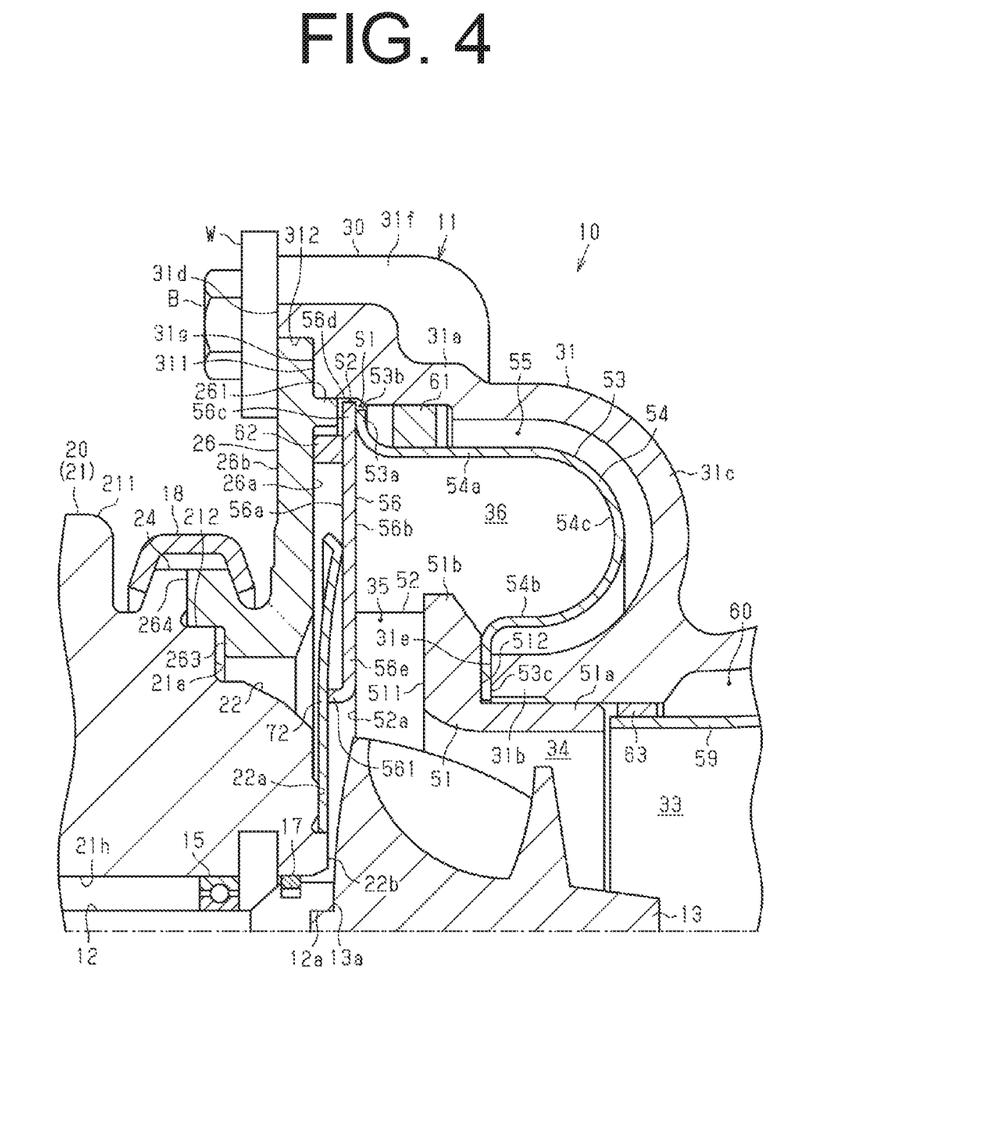
FIG. 4 is a side sectional view of yet another example of the turbocharger according to the present disclosure.

As shown in FIG. 4, the turbocharger 10 may include a spring insulator 72, in place of the cover member 27 and the plate spring 57. The spring insulator 72 is interposed between the end surface 22a of the projected portion 22 of the bearing housing 20, the first end surface 26a of the closing plate 26, and the first end surface 56a of the second passage forming plate 56 in the rotation axis direction of the impeller shaft 12. The inner peripheral part of the spring insulator 72 is mounted to the end surface 22a of the projected portion 22 of the bearing housing 20, and the outer peripheral part of the spring insulator 72 is in contact with the first end surface 56a of the second passage forming plate 56.

The spring insulator 72 urges the second passage forming plate 56 toward the fixed vanes 52. Accordingly, the plate portion 53c of the first passage forming plate 53, the ring portion 51b of the turbine shroud portion 51, the fixed vane 52, and the inner peripheral part 56e of the second passage forming plate 56 are pressed toward the inner peripheral wall end surface 31e of the turbine housing body portion 31, and supported by the end surface 31e. In other words, the inner peripheral part 56e of the second passage forming plate 56 is pressed toward the turbine housing 30 by the urging force of the spring insulator 72 acting on the turbine shroud portion 51 through the second passage forming plate 56 and the fixed vanes 52.

In this case, the inner peripheral part 56e of the second passage forming plate 56 may be held between the closing plate 26 and the fixed vanes 52, regardless of the dimension tolerance of the closing plate 26. The spring insulator 72 suppresses the transfer of the heat of exhaust gas flowing through the turbine chamber 34 to the C-ring 17 via the bearing housing 20. This may suppresses the deterioration of the sealing between the inner peripheral surface of the insertion hole 21h and the outer peripheral surface of the impeller shaft 12 caused by the thermal deformation of the C-ring 17, In other words, the spring insulator 72 serves as a heat insulator functioning similarly to the cover member 27 of the above-described embodiment, and also as an urging member functioning similarly to the plate spring 57 of the above-described embodiment.

The plate portion 53c of the first passage forming plate 53 is pressed toward the inner peripheral wall 31b of the turbine housing body portion 31 by the urging force acting on the ring portion 51b of the turbine shroud portion 51 from the spring insulator 72. Accordingly, the urging force of the spring insulator 72 permits holding of the plate portion 53c of the first passage forming plate 53 with the turbine shroud portion 51 and the turbine housing 30, in addition to the holding of the inner peripheral part 56e of the second passage forming plate 56 by the bearing housing 20 and the fixed vanes 52.

Figure 5:
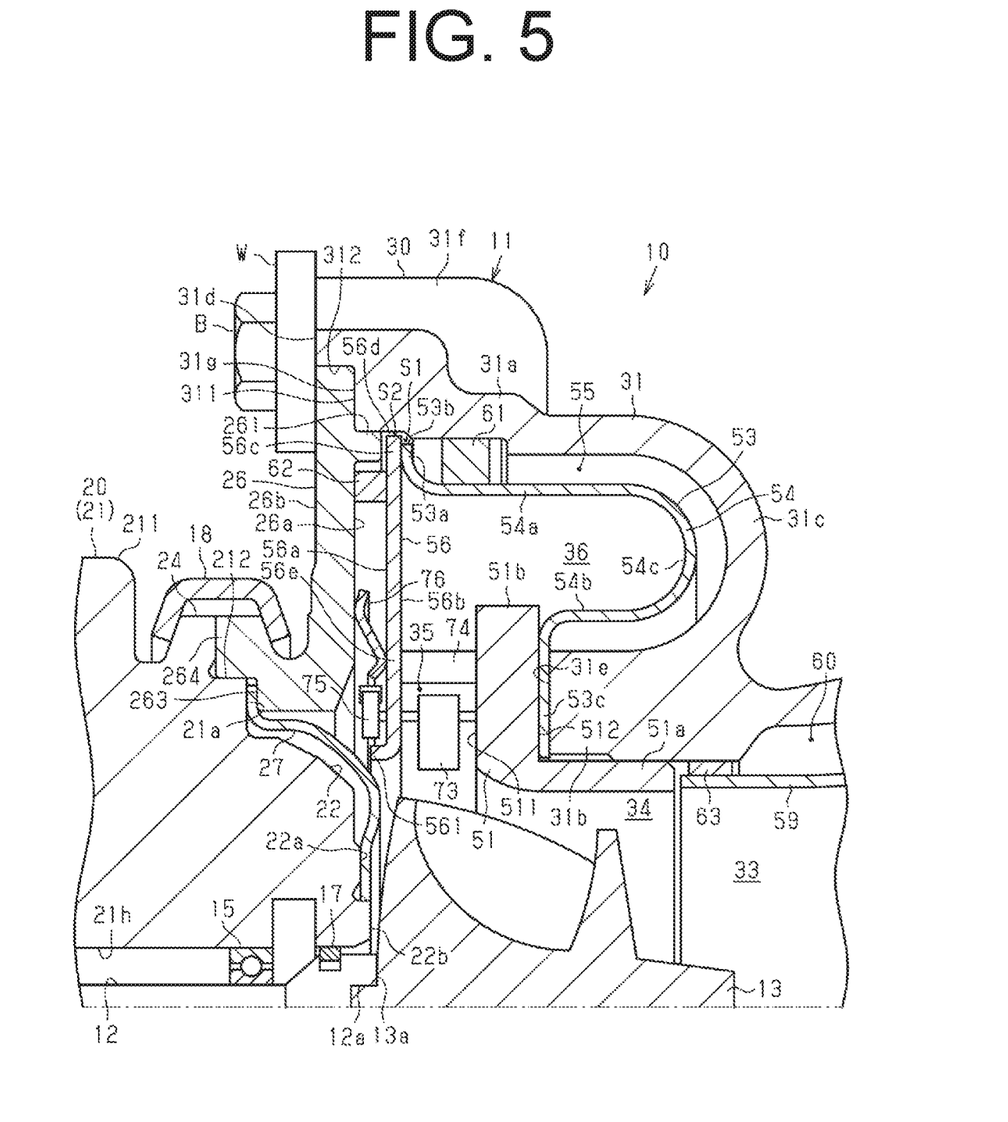
FIG. 5 is a side sectional view of yet another example of the turbocharger according to the present disclosure.

As shown in FIG. 5, the turbocharger 10 may include a plurality of variable vanes 73 that is rotatably supported by the turbine shroud portion 51 and the second passage forming plate 56, in place of the plurality of fixed vanes 52 fixed to the turbine shroud portion 51.

A plurality of variable vanes 73 and a plurality of spacers 74 having a columnar shape are disposed between the one end surface 511 of the ring portion 51b of the turbine shroud portion 51 and the second end surface 56b of the second passage forming plate 56 in the rotation axis direction of the impeller shaft 12. The variable vanes 73 and the spacers 74 are spaced from each other in the circumferential direction of the communication passage 35. The spacers 74 are located outward of the variable vanes 73 in the radial direction of the impeller shaft 12. The spacers 74 maintain a space between the one end surface 511 of the ring portion 51b of the turbine shroud portion 51 and the second end surface 56b of the second passage forming plate 56 in the rotation axis direction of the impeller shaft 12. Thus, the spacers 74 correspond to the spacers that maintain a space between the turbine shroud portion 51 and the second passage forming plate 56. The turbine shroud portion 51 and the second passage forming plate 56 cooperate to rotatably support the variable vanes 73.

Additionally, a plurality of link members 75 and a plate spring 76 are disposed between the bearing housing 20 and the second passage forming plate 56 in the rotation axis direction of the impeller shaft 12. The link members 75 are spaced from each other in the circumferential direction of the communication passage 35. Each of the link members 75 drives its associated variable vane 73 so as to change an angular position of the variable vane 73 relative to the ring portion 51b. This changes the cross sectional area of the communication passage 35, and hence controls the flow rate of exhaust gas introduced into the turbine chamber 34. The plate spring 76 is located inward of the link members 75 in the radial direction of the impeller shaft 12. The plate spring 76 urges the inner peripheral part 56e of the second passage forming plate 56 toward the spacer 74. Accordingly, the plate portion 53c of the first passage forming plate 53, the ring portion 51b of the turbine shroud portion 51, the spacers 74, and the inner peripheral part 56e of the second passage forming plate 56 are pressed toward the inner peripheral wall end surface 31e of the turbine housing body portion 31, and supported by the inner peripheral wall end surface 31e. The plate portion 53c of the first passage forming plate 53 is held by the other end surface 512 of the ring portion 51b of the turbine shroud portion 51 and the inner peripheral wall end surface 31e of the turbine housing body portion 31. The inner peripheral part 56e of the second passage forming plate 56 is held between the closing plate 26 and the spacer 74 via the plate spring 76.

It is noted that a part of the second passage forming plate 56 where an urging force is applied by the plate spring 57, and the spacer 74, and the ring portion 51b of the turbine shroud portion 51 are preferably arranged linearly. This arrangement permits suppressing the bending of the second passage forming plate 56 when the urging force by the plate spring 76 is applied to the second passage forming plate 56.

The plate spring 57 may be omitted, and the second passage forming plate 56 may be held by the second projection 262 of the closing plate 26 and the fixed vane 52. In this case, a slight gap may be formed between the outer peripheral part of the closing plate 26 and the turbine housing body portion 31 depending on the dimensional tolerance of the closing plate 26 Thus, it is preferable to provide a sealing member such as an 0-ring interposed between the outer peripheral wall 31a of the turbine housing body portion 31 and the closing plate 26 in the rotation axis direction of the impeller shaft 12 so as to seal between an inside and an outside of the housing 11.

The first passage forming plate 53 may be omitted. In this case, the wall surface of the turbine scroll passage 36 opposite from the bearing housing 20 is formed by the inner surface of the outer peripheral wall 31a, the inner surface of the inner peripheral wall 31b, and the inner surface of the connecting wall 31c of the turbine housing body portion 31 of the turbine housing 30.

The first passage forming plate 53 may be mounted to the housing 11 with the plate portion 53c held between the ring portion 51b of the turbine shroud portion 51 and the turbine housing 30, and the ring rib 53a held between the bearing housing 20 and the turbine housing 30. In this case, the plate portion 53c and the ring rib 53a are the stationary parts of the first passage forming plate 53.

The plate portion 53c may be omitted, and the first passage forming plate 53 may be mounted to the housing 11 with only the ring rib 53a held between the bearing housing 20 and the turbine housing 30. In this case, the ring rib 53a is a stationary part and an end of the inner peripheral portion 54b opposite from the connecting portion 54c is a free end in the first passage forming plate 53.

The ring rib 53a may be omitted in the first passage forming plate 53. In this case, the outer peripheral end portion of the first passage forming plate 53 is an end portion of the outer peripheral portion 54a opposite from the connecting portion 54c.

The ring rib 53a of the first passage forming plate 53 may be spaced from the outer peripheral end portion 56c of the second passage forming plate 56. When the ring rib 53a of the first passage forming plate 53 is designated as a free end, the side of the ring rib 53a opposite from the outer peripheral end portion 56c of the second passage forming plate 56 may be in contact with surrounding parts disposed surrounding the first passage forming plate 53. Thus, "the outer peripheral end portion of the first passage forming plate 53 being a free end" includes a state where the ring rib 53a of the first passage forming plate 53 is in contact with the surrounding parts, but slidable thereon, and the thermal expansion of the first passage forming plate 53 in the radially outward side thereof is not hindered.

The outer peripheral end portion 56c of the second passage forming plate 56 may be spaced from the ring rib 53a of the first passage forming plate 53. When the outer peripheral end portion 56c of the second passage forming plate 56 is designated as a free end, the outer peripheral end portion 56c may be in contact with the surrounding parts of the second passage forming plate 56, e.g., the first projection 261 of the closing plate 26. Thus, "the outer peripheral end portion 56c of the second passage forming plate 56 being a free end" includes a state where the outer peripheral end portion 56c of the second passage forming plate 56 is in contact with the surrounding parts, but slidable thereon, and the thermal expansion of the second passage forming plate 56 in the radially outward side thereof is not hindered.

The first facing member facing the outer peripheral side surface 56d of the second passage forming plate 56 need not necessarily be the outer peripheral wall 31a of the turbine housing body portion 31 depending on the shape of the second passage forming plate 56 and the positioning of parts in the turbine housing 30. However, the outer peripheral side surface 56d of the second passage forming plate 56 is spaced from the first facing member. In addition, a direction in which the outer peripheral side surface 56d of the second passage forming plate 56 faces the first facing member is not limited the radial direction of the impeller shaft 12, but may be the rotation axis direction of the impeller shaft 12.

The second facing member facing the end surface 53b of the ring rib 53a of the first passage forming plate 53 need not necessarily be the outer peripheral wall 31a of the turbine housing body portion 31 depending on the shape of the first passage forming plate 53 and the positioning of parts in the turbine housing 30. In addition, a direction in which the end surface 53b of the ring rib 53a of the first passage forming plate 53 faces the second facing member is not limited to the radial direction of the impeller shaft 12, but may be the rotation axis direction of the impeller shaft 12.

The shape of the second passage forming plate 56 may be modified in a suitable manner. For example, the second passage forming plate 56 is curved at a portion other than the rib 561.

The first elastic member 61 disposed between the outer peripheral wall 31a of the turbine housing body portion 31 and the outer peripheral portion 54a of the first passage forming plate 53 in the radial direction of the impeller shaft 12 may be omitted.

The first elastic member 61 is not limited to be provided by a wire mesh, but may be provided by other elastic members.

The method for fixing the first elastic member 61 to the outer peripheral portion 54a of the passage forming part 54 of the first passage forming plate 53 is not limited to micro spot welding. For example, the first elastic member 61 may be fixed to the outer peripheral portion 54a of the passage forming part 54 by adhesion using adhesive or riveting.

The second elastic member 62 disposed between the first end surface 56a of the second passage forming plate 56 and the first end surface 26a of the closing plate 26 in the rotation axis direction of the impeller shaft 12 may be omitted.

The second elastic member 62 is not limited to be provided by a wire mesh, but may be provided by other elastic members.

The method for fixing the second elastic member 62 to the first end surface 56a of the second passage forming plate 56 is not limited to micro spot welding. For example, the second elastic member 62 may be fixed to the first end surface 56a of the second passage forming plate 56 by adhesion using adhesive or riveting.

The third elastic member 63 disposed between the end of the outer peripheral surface of the outlet port forming member 59 adjacent to the turbine chamber 34 and the inner peripheral surface of the turbine tubular portion 32 in the radial direction of the impeller shaft 12 may be omitted.

The third elastic member 63 is not limited to be provided by a wire mesh, but may be provided by other elastic members.

The method for fixing the third elastic member 63 to the outer peripheral surface of the outlet port forming member 59 is not limited to micro spot welding. For example, the third elastic member 63 may be fixed to the outer peripheral surface of the outlet port forming member 59 by adhesion using adhesive or riveting.

The turbine shroud portion 51, the fixed vanes 52, and the plate spring 57 may be omitted.

In this case, the plate portion 53c of the first passage forming plate 53 serves as the stationary part that does not move relative to the turbine housing 30 with the plate portion 53c fixed to the inner peripheral wall 31b of the turbine housing body portion 31 by welding. Additionally, the inner peripheral part 56e of the second passage forming plate 56 serves as the stationary part that does not move relative to the bearing housing 20 with the inner peripheral part 56e fixed to the second projection 262 of the closing plate 26 by welding.

In the bearing housing 20, the closing plate 26 need not necessarily be provided separately from the bearing housing body portion 21, but may be formed integrally with the bearing housing body portion 21.

The turbine shroud portion 51 need not necessarily be provided separately from the turbine housing 30, but may be formed integrally with the turbine housing 30. In this case, the wall surface of the communication passage 35 opposite from the bearing housing 20 is formed by the turbine housing 30.

The internal combustion engine E may be provided by a gasoline engine or a diesel engine.

The materials for the bearing housing 20, the turbine housing 30, and the compressor housing 40 are not limited to cast iron, but may be a cast steel.

What is claimed is:

1. A turbocharger comprising:
    a bearing housing having a tubular shape that rotatably supports an impeller shaft;
    a turbine housing that is connected to one end of the bearing housing in a rotation axis direction of the impeller shaft and in which exhaust gas discharged from an internal combustion engine flows;
    a turbine chamber formed in the turbine housing;
    a turbine impeller accommodated in the turbine chamber, the turbine impeller being rotated integrally with the impeller shaft by the exhaust gas flowing into the turbine chamber;
    a turbine scroll passage formed in the turbine housing, the turbine scroll passage forming a part of a passage through which the exhaust gas flowing into the turbine housing is introduced to the turbine chamber, and surrounding an outer periphery of the turbine chamber;
    a communication passage having an annular shape and formed in the turbine housing, the communication passage providing communication between the turbine scroll passage and the turbine chamber; and
    a bearing housing side plate made of sheet metal and having an annular shape, the bearing housing side plate forming a wall surface of the turbine scroll passage and the communication passage on the bearing housing side, wherein
    the bearing housing side plate has an inner peripheral part that is a stationary part relative to the bearing housing, and an outer peripheral end portion that is a free end, and
    the bearing housing side plate has an outer peripheral side surface that is spaced from a first facing member facing the outer peripheral side surface.

2. The turbocharger according to claim 1, wherein
    the turbocharger includes a turbine side plate facing the bearing housing side plate, the turbine side plate forming the wall surface of the turbine scroll passage opposite from the bearing housing,
    the turbine side plate has an inner peripheral part that is a stationary part relative to the bearing housing, and an outer peripheral end portion that is a free end, and
    the turbine side plate has an outer peripheral side surface that is spaced from a second facing member that faces the outer peripheral side surface of the turbine side plate.

3. The turbocharger according to claim 2, wherein
    the turbocharger includes:

a turbine shroud portion forming a wall surface of the communication passage opposite from the bearing housing, and a spacer that is disposed in the communication passage, the spacer maintaining a space between the bearing housing side plate and the turbine shroud portion, the inner peripheral part of the bearing housing side plate does not move relative to the bearing housing with the inner peripheral part of the bearing housing side plate held between the spacer and the bearing housing, and the inner peripheral part of the turbine side plate does not move relative to the turbine housing with the inner peripheral part of the turbine side plate held between the turbine shroud portion and the turbine housing.

4. The turbocharger according to claim 3, wherein
the turbine housing has an opening that is opened to the bearing housing side, the bearing housing closes the opening of the turbine housing with the bearing housing in contact with the turbine housing, and the turbocharger includes an urging member that is interposed between the bearing housing side plate and the bearing housing in a rotation axis direction of the impeller shaft, and is disposed side by side with the communication passage with the bearing housing side plate disposed between the urging member and the communication passage, wherein the urging member urges the inner peripheral part of the bearing housing side plate towards the spacer.

5. The turbocharger according to claim 4, wherein
the inner peripheral part of the turbine side plate is pressed toward the turbine housing by an urging force of the urging member acting on the turbine shroud portion through the bearing housing side plate and the spacer.

6. The turbocharger according to claim 4, wherein
the turbocharger includes a heat insulator having an annular shape that is interposed between the urging member and the bearing housing side plate in the rotation axis direction of the impeller shaft.

7. The turbocharger according to claim 3, wherein
the turbine housing has an opening that is opened to the bearing housing side, the bearing housing closes the opening of the turbine housing with the bearing housing in contact with the turbine housing, the bearing housing has an insertion hole through which the impeller shaft is inserted and a sealing member that is disposed between an inner peripheral surface of the insertion hole and an outer peripheral surface of the impeller shaft, and the turbocharger includes a spring insulator that is mounted to one end of the bearing housing in the rotation axis direction of the impeller shaft, is disposed between the bearing housing and the bearing housing side plate in the rotation axis direction of the impeller shaft, wherein the spring insulator urges the bearing housing side plate toward the spacer.

8. The turbocharger according to claim 7, wherein
the inner peripheral part of the turbine side plate is pressed toward the turbine housing by an urging force of the spring insulator acting on the turbine shroud portion through the bearing housing side plate and the spacer.

9. The turbocharger according to claim 1, wherein
the turbocharger includes an elastic member that is interposed between the bearing housing side plate and the bearing housing in the rotation axis direction of the impeller shaft.

* * * * *